United States Patent
Yokota et al.

(10) Patent No.: US 8,723,384 B2
(45) Date of Patent: May 13, 2014

(54) ROTOR OF ROTARY ELECTRIC MACHINE

(75) Inventors: Hirohisa Yokota, Chiyoda-ku (JP); Shinsuke Kayano, Chiyoda-ku (JP); Yoshiaki Kitta, Chiyoda-ku (JP)

(73) Assignee: Mitsubishi Electric Corporation, Tokyo (JP)

(*) Notice: Subject to any disclaimer, the term of this patent is extended or adjusted under 35 U.S.C. 154(b) by 17 days.

(21) Appl. No.: 13/402,037

(22) Filed: Feb. 22, 2012

(65) Prior Publication Data

US 2013/0093279 A1  Apr. 18, 2013

(30) Foreign Application Priority Data

Oct. 14, 2011  (JP) .................................. 2011-226304

(51) Int. Cl.
*H02K 21/12* (2006.01)

(52) U.S. Cl.
USPC .......... 310/156.22; 310/156.61; 310/216.114; 310/216.116; 310/216.131

(58) Field of Classification Search
USPC ............ 310/156.22, 156.24, 156.53, 156.54, 310/156.56, 156.61, 156.74, 156.79, 310/216.114–216.116, 216.121, 216.122, 310/216.131, 211, 261.1
See application file for complete search history.

(56) References Cited

U.S. PATENT DOCUMENTS

| | | | | |
|---|---|---|---|---|
| 1,192,404 | A * | 7/1916 | Ewart | 403/261 |
| 2,927,229 | A * | 3/1960 | Merrill | 310/162 |
| 4,697,114 | A * | 9/1987 | Amemiya et al. | 310/156.61 |
| 5,140,211 | A * | 8/1992 | Ucida | 310/156.61 |
| 7,649,293 | B2 * | 1/2010 | Maldener et al. | 310/156.22 |
| 7,986,068 | B2 * | 7/2011 | Suzuki et al. | 310/156.22 |
| 2009/0315423 | A1 * | 12/2009 | Suzuki et al. | 310/156.12 |

FOREIGN PATENT DOCUMENTS

| | | |
|---|---|---|
| JP | 53100415 A | 9/1978 |
| JP | 08088963 A | 4/1996 |
| JP | 2010-4630 A | 1/2010 |
| JP | 4667640 A | 1/2010 |
| JP | 2011030286 A | 2/2011 |

OTHER PUBLICATIONS

Japanese Office Action, dated Aug. 20, 2013, Patent Application No. 2011-226304.

* cited by examiner

*Primary Examiner* — Dang Le (74) *Attorney, Agent, or Firm* — Sughrue Mion, PLLC (57) ABSTRACT

A rotary electric machine is provided with a shaft which is a rotary shaft; a laminated core which has a permanent magnet embedded therein and is press-fitted to the shaft; a first member which is a magnetic member and is press-fitted to the shaft so as to hold an end portion of the laminated core; a second member which is a nonmagnetic member and is provided between the end portion of the laminated core and the first member so as to hold an end portion, with respect to the axial direction of the shaft, of the permanent magnet; and at least one of a first gap between the first member and the second member, and a second gap between the laminated core and the second member.

11 Claims, 8 Drawing Sheets

ROTOR OF ROTARY ELECTRIC MACHINE

BACKGROUND OF THE INVENTION

1. Field of the Invention

The present invention relates to a rotor of a rotary electric machine.

2. Description of the Background Art

Conventionally, as a rotor of permanent-magnet-embedded type, there is proposed a rotor in which a nonmagnetic member is engaged with a magnetic member, and an end portion of a magnet embedded in a laminated core is held by the nonmagnetic member, so that the flux leakage from the magnet into an end plate will be reduced (see, for example, Patent Documents 1 and 2).

Patent Document 1: Japanese Laid-Open Patent Publication No. 20104630
Patent Document 2: Japanese Patent No. 4667640

In a rotor disclosed in Patent Document 1, a ring-shaped plate (nonmagnetic material) is pressed to a laminated core by an end plate (magnetic material), so that the ring-shaped plate is fixed. As a result, there is a problem that if soft nonmagnetic material such as a resin or aluminum is used for the ring-shaped plate, the ring-shaped plate is deformed by being pressed by the end plate.

In a rotor disclosed in Patent Document 2, members made from nonmagnetic material, and members made from magnetic material are alternately arranged along the circumferential direction, and these members are fixed being swaged with each other.

In the case where the nonmagnetic members and the magnetic members are fixed in close contact with each other over the whole circumference as described above, when the temperature of the rotor increases owing to iron loss or the like during the operation of a motor, excessive interference occurs between the nonmagnetic members and the magnetic members, because the thermal expansion coefficients are greatly different between the nonmagnetic members and the magnetic members.

Therefore, there is a problem that if soft nonmagnetic material such as a resin or aluminum is used for the nonmagnetic members, the nonmagnetic members are deformed.

SUMMARY OF THE INVENTION

The present invention has been made to solve the above problems, and an object of the present invention is to provide a rotor of a rotary electric machine that includes members, for holding end portions of a laminated-core, that are not deformed by thermal expansion.

A rotor of a rotary electric machine according to the present invention comprises: a shaft which is a rotary shaft; a laminated core which has a permanent magnet embedded therein and is press-fitted to the shaft; a first member which is a magnetic member and is press-fitted to the shaft so as to hold the laminated core; a second member which is a nonmagnetic member and is provided between an end portion of the laminated core and the first member so as to hold an axial end portion of the permanent magnet; and at least one of a first gap between the first member and the second member, and a second gap between the laminated core and the second member.

The rotor of the rotary electric machine according to the present invention comprises at least one of the first gap between the first member holding the laminated core and the second member holding the permanent magnet, and the second gap between the laminated core and the second member. Therefore, the flux leakage from the permanent magnet into the second member can be reduced, and iron loss and decrease in output level can be suppressed.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Hereinafter, a rotor of a rotary electric machine according to the present invention will be described with reference to the drawings.

Figure 1:
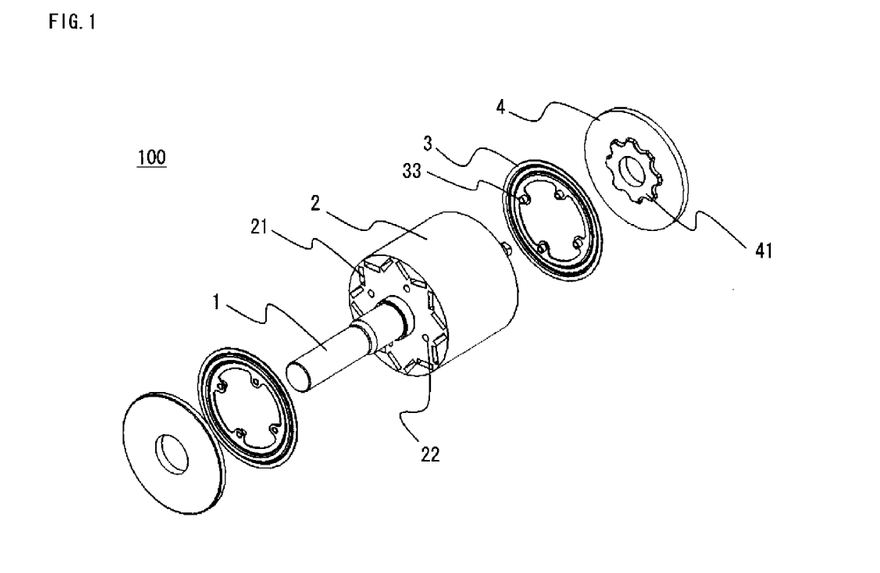
FIG. 1 is a perspective exploded view of a rotor of a rotary electric machine according to the first embodiment of the present invention.

FIG. 1 is a perspective exploded view of a rotor 100 of the rotary electric machine.

Figure 2:
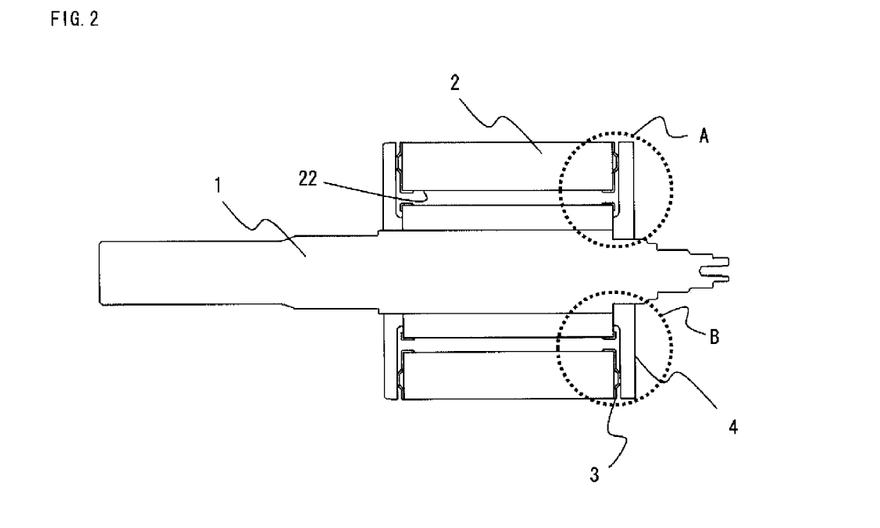
FIG. 2 is a sectional view of the rotor of the rotary electric machine according to the first embodiment of the present invention.

FIG. 2 is a sectional view of the rotor 100 along the axial direction.

Figure 3A:
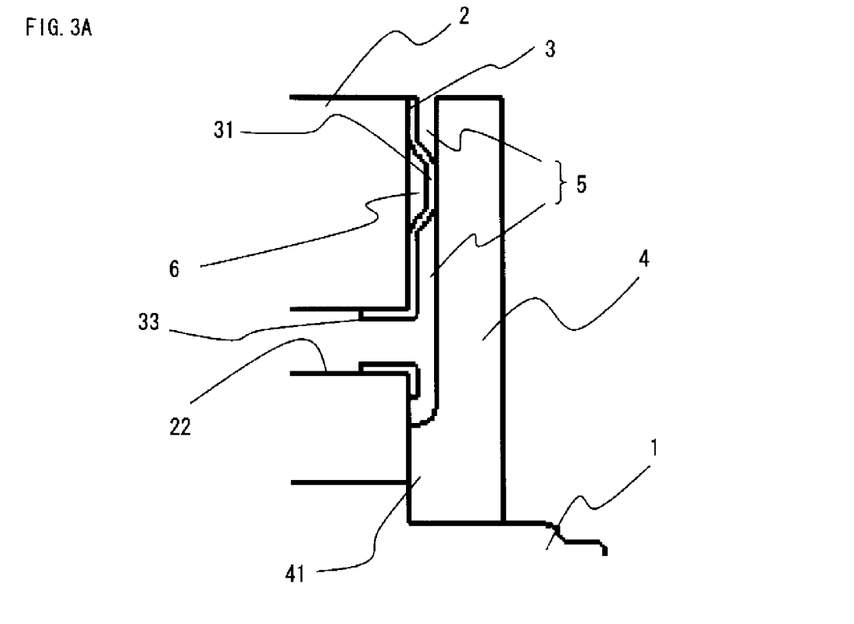
FIG. 3 are enlarged sectional views of specific parts of the rotor of the rotary electric machine according to the first embodiment of the present invention.
Figure 3B:
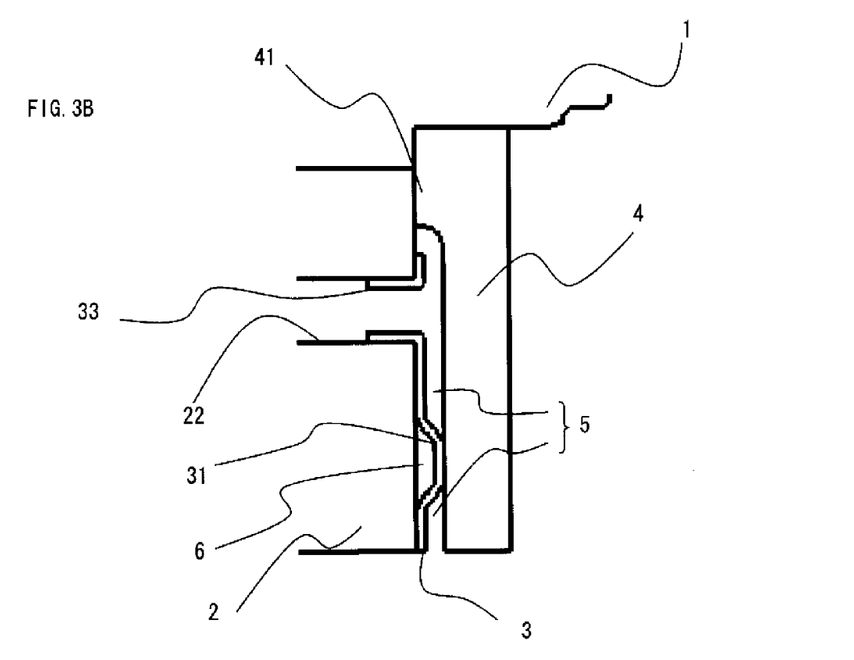

FIGS. 3A and 3B are enlarged views of parts indicated by circles A and B in FIG. 2, respectively.

As shown in the drawings, in the rotor 100, a laminated core 2 having permanent magnets 21 embedded therein is press-fitted to a shaft 1 which is a rotary shaft, and second members 3 made from nonmagnetic material and first members 4 made from magnetic material are attached to the assembled unit, from both ends of the shaft 1.

Each of the second members 3 is a disk-like member formed from one nonmagnetic plate, and includes a first convex portion 31 protruding in a flange fashion toward the first member 4.

In addition, the second member 3 has protrusions 33 having a cylindrical shape and formed through a burring process, and the protrusions 33 are press-fitted into holes 22 that open at end portions of the laminated core 2, whereby the second member 3 is fixed. The second member 3 holds end portions of the permanent magnets 21 so as to prevent the end portions being displaced from an end portion of the laminated core 2.

Each of the first member 4 is a disk-like member made from nonmagnetic material, and is press-fitted to the shaft 1.

The first member 4 has a second convex portion 41 having a ring-like shape and protruding in the axial direction of the shaft 1. The second convex portion 41 is formed, in an area surrounding the shaft 1 press-fitted to the first member 4, on the laminated-core-2-side surface of the first member 4.

When the first member 4 is press-fitted to the shaft 1, the second convex portion 41 presses the laminated core 2.

Since a large area of the first member 4 is in contact with the shaft 1 when the first member 4 is press-fitted to the shaft 1, the first member 4 is fabricated by using magnetic material having a thermal expansion coefficient equal to or close to the thermal expansion coefficient of the material of the shaft 1.

The reason is as follows. In the case where the thermal expansion coefficients are greatly different between the first member 4 and the shaft 1, excessive interference occurs between the first member 4 and the shaft 1. As a result, the first member 4 is deformed, or on the contrary, the press-fit portion is loosened.

It is noted that since the second member 3 is a nonmagnetic member, in this case, the difference between the thermal expansion coefficients of the first member 4 and the shaft 1 is smaller than the difference between the thermal expansion coefficients of the second member 3 and the shaft 1.

Although a tip portion of the first convex portion 31 formed on the second member 3 is in contact with the first member 4, the tip portion is not fixed to the first member 4.

In addition, a first gap 5 that is perpendicular to the axial direction of the shaft 1 is present between the first member 4, and a portion of the second member 3 other than the tip portion of the first convex portion 31.

Therefore, even if the first member 4 thermally expands, a portion of the first member 4 that is in contact with the first convex portion 31 of the second member 3 is just displaced, and the second member 3 is not deformed by thermal stress.

A second gap 6 is present between the first convex portion 31 of the second member 3, and the corresponding end portion of the laminated core 2 (i.e., on the back side of the first convex portion 31).

In the rotor of the rotary electric machine according to the first embodiment of the present invention, a magnet containing portion of the laminated core 2 is covered with the second member 3 which is a nonmagnetic member, whereby the flux leakage from the permanent magnets 21 into the first member 4 can be reduced, and iron loss and decrease in output level can be suppressed.

In addition, the first convex portion 31 protruding in the axial direction of the shaft 1 is provided, along the circumferential direction, on the laminated-core-2-side surface of the second member 3. Therefore, there is a predetermined interval between the permanent magnets 21 and the first member 4, whereby the flux leakage can be further reduced.

In addition, the second member 3 has strength owing to the ring-shaped first convex portions 31 provided thereon. Therefore, the second member 3 can be designed so as to have a decreased thickness.

In addition, the first member 4 and the shaft 1 are made from materials having thermal expansion coefficients close to each other. Therefore, even if iron loss occurs in the laminated core 2 owing to the operation of the rotary electric machine and then the temperature increases, the engagement between the shaft 1 and the first member 4 can be maintained in an appropriate state.

In addition, the first member 4 and the second member 3 are not fixed to each other. Therefore, even if soft nonmagnetic material such as a resin or aluminum is used for the first member 4, the second member 3 is not deformed owing to the thermal influence.

In the present embodiment, since the second member 3 is formed from one plate as an example, the second member 3 necessarily has the second gap 6 on the back side of the first convex portion 31. However, the second member 3 may occupy the space corresponding to the second gap 6.

Second Embodiment

Hereinafter, the second embodiment of the present invention will be described focusing on the difference from the first embodiment, with reference to the drawings.

Figure 4A:
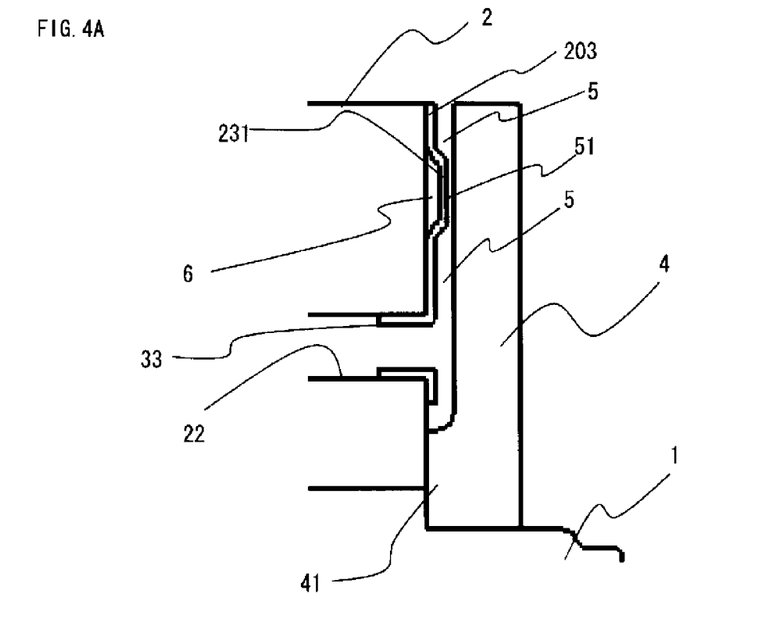
FIG. 4 are enlarged sectional views of specific parts of a rotor of a rotary electric machine according to the second embodiment of the present invention.
Figure 4B:
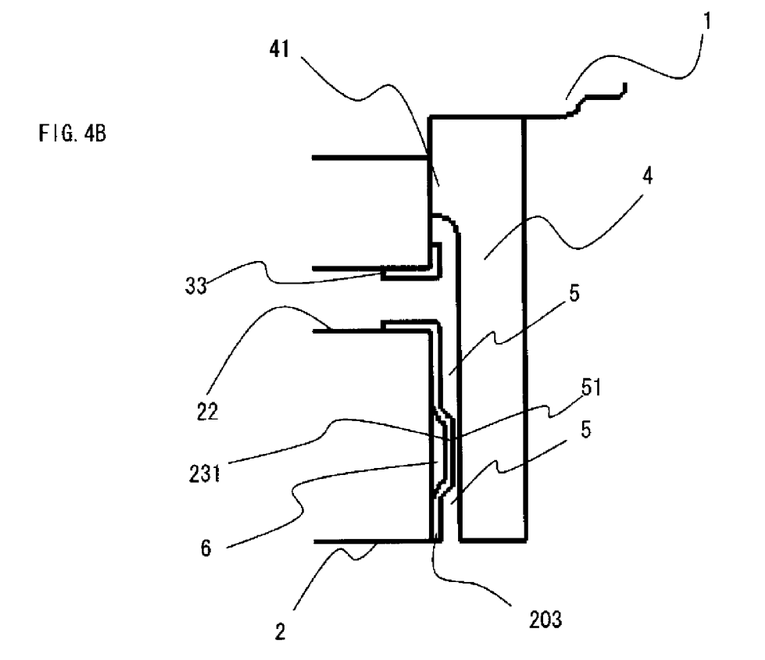

FIGS. 4A and 4B are enlarged sectional views of specific parts of a rotor of a rotary electric machine according to the second embodiment, and correspond to FIGS. 3A and 3B used in the description of the first embodiment.

In the present embodiment, a first convex portion 231 provided on a second member 203 is not in contact with the first member 4. A gap 51 (which is included in a first gap in claims) is present between a tip portion of the first convex portion 231, and the disk surface of the first member 4, over the whole circumference of the second member 203. The gap 51 is in communication with the radially outer portion and the radially inner portion of the first gap 5.

Air flows through the gap 51, whereby air around the surface of the second member 203 is exchanged, and thus the second member 203 can be cooled.

In FIG. 4, the protrusion amount of the first convex portion 231 is designed to be smaller than that of the first convex portion 31 of the first embodiment, whereby the gap 51 is secured. However, the protrusion amount of the second convex portion 41 of the first member 4 may be designed to be larger than that of the first embodiment, whereby the gap 51 is secured.

In the case where the width of the gap 51 between the first member 4 and the second member 203 is designed to be smaller than the width of an air gap between the outer circumferential surface of the rotor, and the inner circumferential surface of a stator which is not shown, the following advantage is obtained. Even if the rotary electric machine is operated in the state in which a foreign substance caused in a fabrication process is present inside the laminated core 2, such a large foreign substance that can be stuck in the air gap does not enter the air gap.

On the other hand, in the case where the width of the gap 51 between the first member 4 and the second member 203 is designed to be equal to or larger than the width of the air gap, it is possible to remove a foreign substance by inserting a cleaner or the like into the gap 51.

The size of the gap 51 may be designed appropriately in accordance with the size, the intended use, or the required cooling efficiency of the rotary electric machine.

The rotor of the rotary electric machine according to the second embodiment of the present invention realizes increased cooling efficiency, as well as providing the same effect as in the first embodiment.

Third Embodiment

Hereinafter, the third embodiment of the present invention will be described focusing on the difference from the first embodiment, with reference to the drawings.

Figure 5:
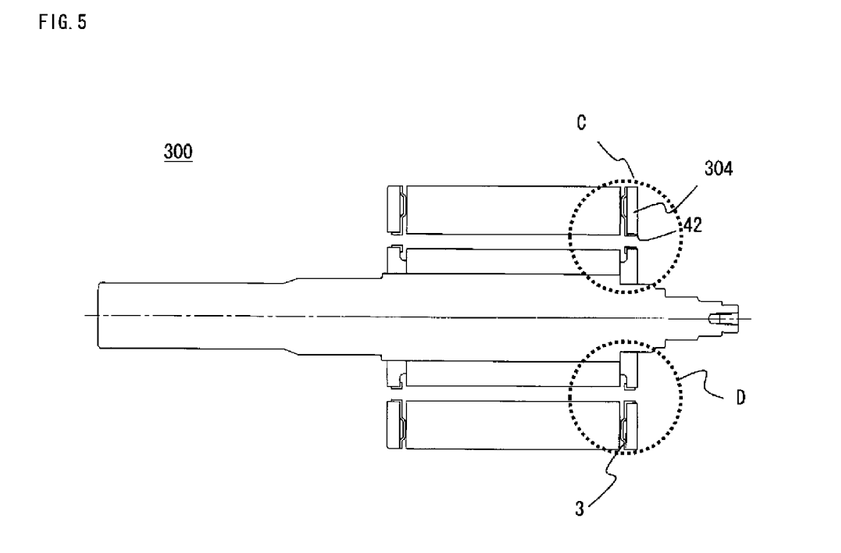
FIG. 5 is a sectional view of a rotor of a rotary electric machine according to the third embodiment of the present invention.

FIG. 5 is a sectional view of a rotor 300 of a rotary electric machine according to the third embodiment of the present invention.

Figure 6A:
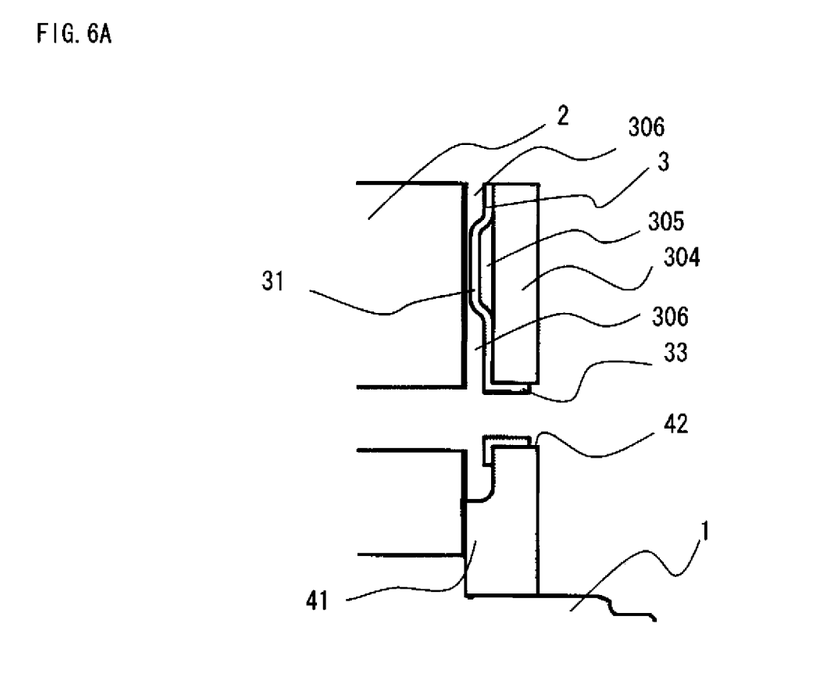
FIG. 6 are enlarged sectional views of specific parts of the rotor of the rotary electric machine according to the third embodiment of the present invention.
Figure 6B:
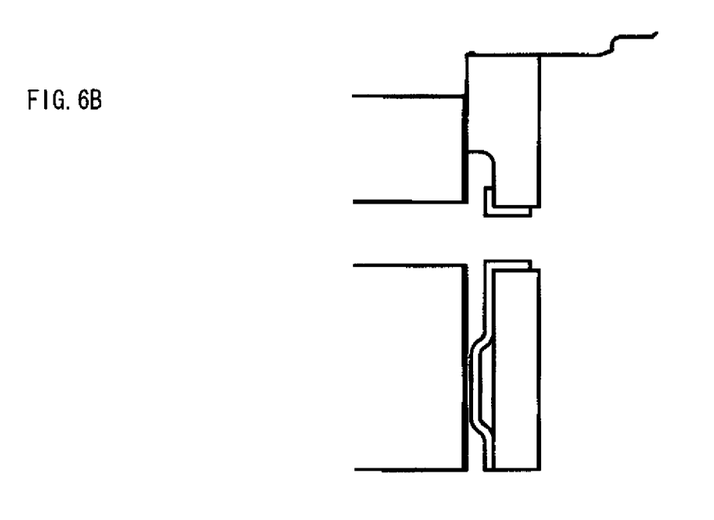

FIGS. 6A and 6B are enlarged views of parts indicated by circles C and D in FIG. 5, respectively.

As shown in the drawings, the present embodiment is different from the first embodiment in that the second member 3 is attached to holes 42 provided in a first member 304.

A first gap 305 is present between the first member 304 and the second member 3, and a second gap 306 is present between the second member 3 and the laminated core 2.

Owing to the holes 42 penetrating through the first member 304, it is possible to exchange air in the second gap 306, thereby decreasing the temperatures of the laminated core 2 and the second member 3.

In order to fix the first member 304 and the second member 3 to each other, it is only necessary to press-fit the protrusions 33, which are formed through a burring process, into the holes 42 provided at regular intervals on the disk surface of the first member 304, as in the first embodiment. It is not necessary to engage the first member 304 and the second member 3 with each other over the whole circumferences.

Therefore, the thermal influence of the first member 304 on the second member 3 can be reduced.

The rotor 300 of the rotary electric machine according to the third embodiment of the present invention provides the same effect as in the first embodiment.

In addition, since the holes 42 to which the second member 3 is attached penetrate through the first member 304, the rotor 300 of the rotary electric machine realizes further increased cooling efficiency.

In the present embodiment, as in the first embodiment, since the second member 3 is formed from one plate as an example, the second member 3 necessarily has the first gap 305 on the back side of the first convex portion 31. However, the second member 3 may occupy the space corresponding to the first gap 305.

Fourth Embodiment

Hereinafter, the fourth embodiment of the present invention will be described focusing on the difference from the first embodiment, with reference to the drawings.

Figure 7:
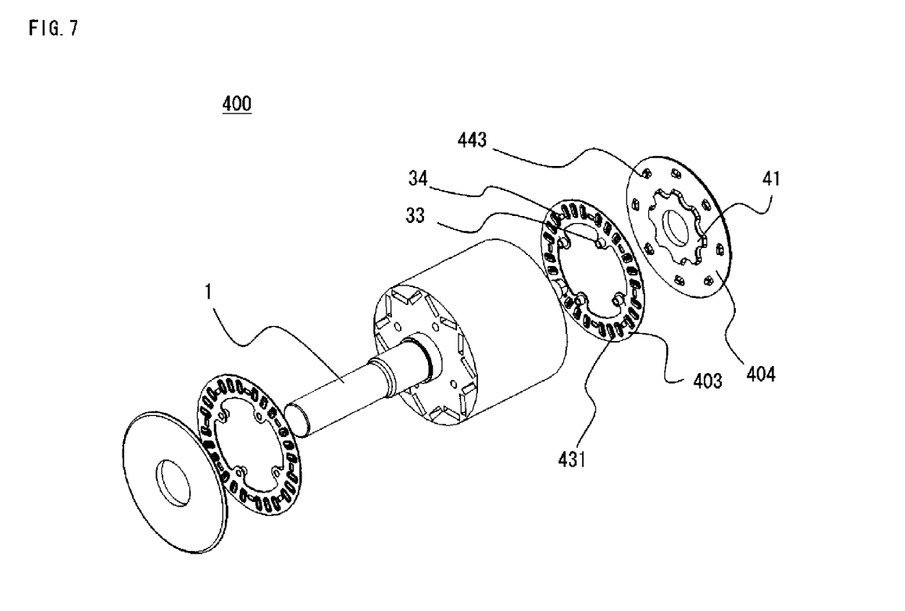
FIG. 7 is a perspective exploded view of a rotor of a rotary electric machine according to the fourth embodiment of the present invention.

FIG. 7 is a perspective exploded view of a rotor 400 of a rotary electric machine.

Figure 8:
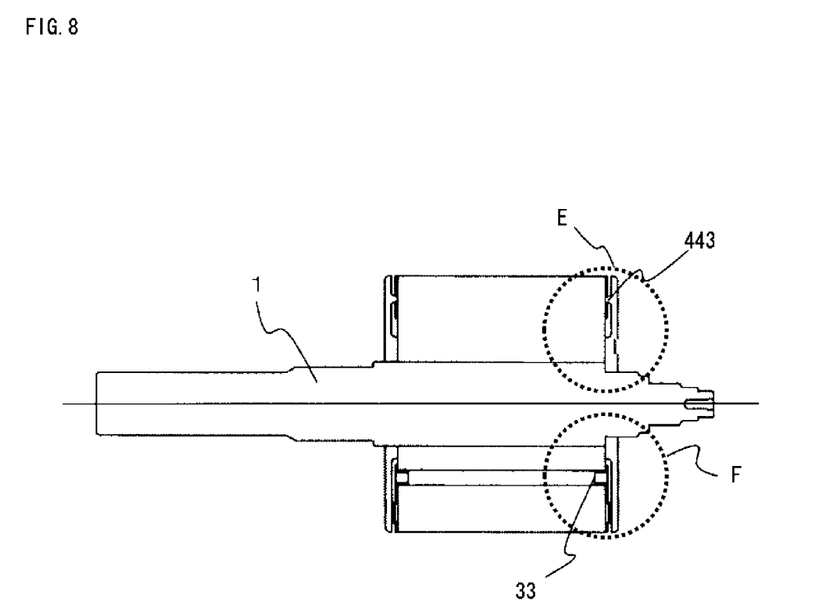
FIG. 8 is a schematic sectional view of the rotor of the rotary electric machine according to the fourth embodiment of the present invention.

FIG. 8 is a schematic sectional view of the rotor 400 along the axial direction.

In FIG. 8, the upper half of the view with respect to the center axis of the shaft 1 is a sectional view along a plane including one of third convex portions 443 provided on the laminated-core-2-side surface of a first member 404. The lower half is a sectional view along a plane including one of the protrusions 33 which are formed on a second member 403 through a burring process.

Figure 9A:
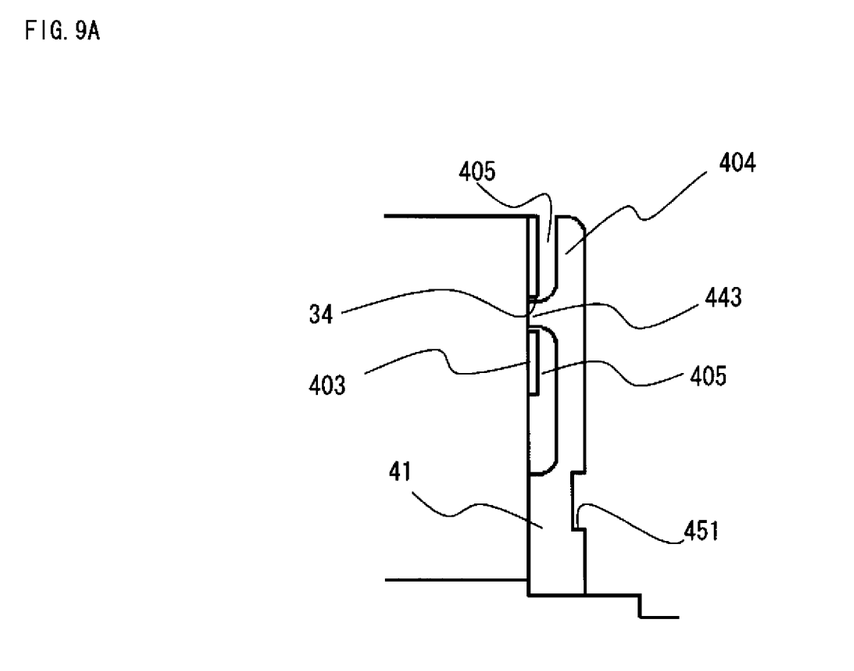
FIG. 9 are enlarged sectional views of specific parts of the rotor of the rotary electric machine according to the fourth embodiment of the present invention.
Figure 9B:
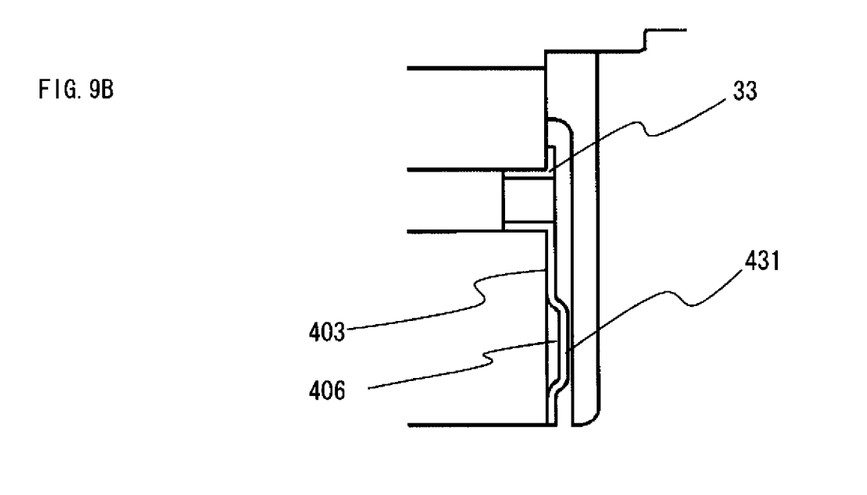

FIGS. 9A and 9B are enlarged views of parts indicated by circles E and F in FIG. 8, respectively.

The first difference between the rotor 400 according to the present embodiment and the rotor 100 according to the first embodiment is that the third convex portions 443 are provided on the laminated-core-2-side surface of the first member 404, and holes 34 through which the third convex portions 443 penetrate are provided in the second member 403.

The third convex portions 443 presses the corresponding end surface of the laminated core 2 through the holes 34.

The second difference is that although in the first embodiment, the first convex portions 31 are provided in a flange fashion on the second member 403, in the fourth embodiment, a plurality of separate first convex portions 431 are provided so as to be arranged in a circle centered on the center of the second member 403.

The third difference is that a cutout 451 is provided on the first member 404, whereby the rotation of the rotor 400 is balanced.

In the rotor 400 of the rotary electric machine according to the fourth embodiment of the present invention, the plurality of third convex portions 443 provided in the vicinity of the outer circumference of the first member 404, as well as the second convex portion 41 provided in the vicinity of the center area (inner circumference) of the first member 404, press the laminated core 2. Therefore, laminated steel plates of the laminated core 2 can be sufficiently fixed.

In addition, a gap 405 between the first member 404 and the laminated core 2 is uniformly formed over the whole circumference. Therefore, the rotational balance of the rotor 400 can be maintained in a preferable state.

In addition, since the first convex portions 431 are separated, air around the first members 404, the second members 403, and the laminated core 2 is circulated and exchanged through the gaps 405 between the first convex portions 431. Thus, thermal expansion of each member can be reduced.

In addition, since the first member 404 is a magnetic member having an outer diameter substantially equal to that of the laminated core 2, a sufficient space for providing the cutout 451 can be secured on the surface of the first member 404. Thus, the rotational balance of the rotor 400 can be easily adjusted.

It is noted that, within the scope of the present invention, the above embodiments may be freely combined with each other, or each of the above embodiments may be modified or abbreviated as appropriate.

Various modifications and alterations of this invention will be apparent to those skilled in the art without departing from the scope and spirit of this invention, and it should be understood that this is not limited to the illustrative embodiments set forth herein.

What is claimed is:

1. A rotor of a rotary electric machine comprising:
   a shaft which is a rotary shaft;
   a laminated core which has a permanent magnet embedded therein and is press-fitted to the shaft;
   a first member which is a magnetic member and is press-fitted to the shaft so as to hold the laminated core;
   a second member which is a nonmagnetic member and is provided between an end portion of the laminated core and the first member so as to hold an end portion, with respect to the axial direction of the shaft, of the permanent magnet;
   at least one of a first gap between the first member and the second member, and a second gap between the laminated core and the second member;
   the first member has a plurality of third convex portions which are arranged in a circle centered on the rotational axis of the shaft and which protrude in the axial direction of the shaft toward the laminated core;
   the second member has a plurality of second holes arranged in a circle centered on the rotational axis of the shaft, and
   the plurality of third convex portions press the laminated core through the plurality of second holes.

2. The rotor of the rotary electric machine according to claim 1, wherein
   the at least one of the first gap and the second gap includes a space present in the axial direction of the shaft from the end portion of the permanent magnet.

3. The rotor of the rotary electric machine according to claim 1, wherein the second member is fixed to one of the first member and the end portion of the laminated core.

4. The rotor of the rotary electric machine according to claim 3, wherein
the second member is formed from one plate, has a first convex portion protruding in the axial direction of the shaft, and has one of the first gap and the second gap on the back side of the first convex portion.

5. The rotor of the rotary electric machine according to claim 4, wherein the first convex portion comprises a plurality of convex portions arranged in a circle centered on the center of the second member.

6. The rotor of the rotary electric machine according to claim 4, wherein the first convex portion is in contact with the first member.

7. The rotor of the rotary electric machine according to claim 1, wherein
the first member has a second convex portion protruding in the axial direction of the shaft toward the laminated core, the second member has a first hole at the center thereof, and the second convex portion presses the laminated core through the first hole.

8. The rotor of the rotary electric machine according to claim 7, wherein the second convex portion is formed in an area surrounding the shaft press-fitted to the first member.

9. The rotor of the rotary electric machine according to claim 1, wherein the outer diameter of the first member is substantially equal to the outer diameter of the laminated core.

10. The rotor of the rotary electric machine according to claim 1, wherein the first member is subjected to a balance adjusting process.

11. The rotor of the rotary electric machine according to claim 1, wherein the difference in thermal expansion coefficient between the first member and the shaft is smaller than the difference in thermal expansion coefficient between the second member and the shaft.

* * * * *